United States Patent [19]
Klein

[11] Patent Number: 6,047,381
[45] Date of Patent: *Apr. 4, 2000

[54] VARIABLE SPEED CONTROLLER

[75] Inventor: Dean A. Klein, Lake City, Minn.

[73] Assignee: Micron Electronics, Inc., Nampa, Id.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/925,885

[22] Filed: Sep. 8, 1997

Related U.S. Application Data

[63] Continuation of application No. 08/189,254, Jan. 28, 1994, Pat. No. 5,666,522.

[51] Int. Cl.⁷ ...................................................... G06F 1/08
[52] U.S. Cl. ........................................... 713/501; 713/600
[58] Field of Search ..................................... 395/555, 556, 395/558, 559; 713/500, 501, 503, 600

[56] References Cited

U.S. PATENT DOCUMENTS

| 4,893,271 | 1/1990 | Davis et al. | 364/900 |
|---|---|---|---|
| 5,226,122 | 7/1993 | Thayer et al. | 395/275 |
| 5,261,082 | 11/1993 | Ito et al. | 395/550 |
| 5,319,771 | 6/1994 | Takeda | 395/550 |
| 5,483,659 | 1/1996 | Yamamura | 712/43 |
| 5,666,522 | 9/1997 | Klein | 395/556 |

Primary Examiner—Dennis M. Butler
Attorney, Agent, or Firm—Dorsey & Whitney LLP

[57] ABSTRACT

A variable speed controller is disclosed that is capable of processing selected commands at a faster-than-normal rate. The invention is useful in the context of x86-based microcomputers to speed up the execution of MASK-A20 and/or RESET-CPU commands that are normally carried out by an 8042-based controller. Execution time for these operations is improved, yet compatibility with existing peripherals and/or code is retained.

12 Claims, 6 Drawing Sheets

VARIABLE SPEED CONTROLLER

This is a continuation of application Ser. No. 08/189,254, filed Jan. 28, 1994, now U.S. Pat. No. 5,666,522.

BACKGROUND OF THE INVENTION

1. Field of the Invention

This invention relates to a variable-speed controller for use in a computer. More particularly, the invention relates to using a variable speed controller to increase the speed of selected operations.

2. Description of Prior Art

Modern personal computers have undergone significant performance improvements during the past decade. These increases in performance have been driven primarily by performance increases of several orders of magnitude in the x86 family of microprocessors. Intel's original 8086 processor was succeeded by the 80286 microprocessor, which was succeeded by the 80386, and then by the 80486. The most recent addition to the x86 family of microprocessors is Intel's Pentium. Each generation of the x86 processors significantly improved the speed and capabilities of the previous generation. Although the original 8086 processor was designed in the late seventies, designers developing systems based on later-generation x86 microprocessors have always been careful to retain software-compatibility with the original 8086 architecture.

The 8086 uses a segmented addressing mechanism whereby a 16-bit segment register is combined with a 16-bit offset in a manner that results in a 20-bit physical address. This 20-bit address enables one megabyte (220) of memory to be addressed in sixteen 64-Kbyte segments. Since segments are 64-Kbytes in length, a segment starting at 00000 hex, for example, extends to 0FFFF hex. And because an 8086 physical address is only twenty bits long, segments that start within 64-Kbytes of the top of the one megabyte address space will wrap-around to the bottom of the address space once the one megabyte boundary is reached. To illustrate this concept, consider a 64-Kbyte segment that begins at FFF00 hex. The "end" of this segment is at 0FEFF hex: the segment extends from FFF00 hex to FFFFF hex, and then wraps around the one megabyte boundary and runs from 00000 hex to 0FEFF hex.

With the 80286 microprocessor, however, Intel designed a new address mapping scheme called "protected" mode. The protected mode addressing scheme was Intel's attempt to provide a robust means by which several programs can be executed at once. In 80286 protected mode, the segment register is used in a manner that increases the physical address length from 20 bits to 24 bits. This twenty-four bit physical address enables 16 megabytes to be addressed, as opposed to the one megabyte address space for the 8086. In addition, the later-introduced 80386, 80486 and Pentium processors have a 32-bit physical address, enabling 4 gigabytes of memory to be addressed. Because the 80286 and higher processors have a physical address wider than 20 bits, a 64-Kbyte segment that begins within 64-Kbytes of the one megabyte boundary will not wrap-around at the one megabyte boundary. For example, an address that begins at FFF00 hex will extend to 10FEFF hex. Thus, because addresses 100000 hex and higher can be expressed in a 24- or 32-bit address, wrap-around at the one-megabyte boundary will not occur in the 80286, 80386, 80486, and Pentium processors. This functional difference renders software written for the 8086 incompatible with the protected mode operation of the 80286, 80386, 80486, and Pentium processors.

To maintain compatibility with software written for the original 8086 architecture, 80286 and higher microprocessors have a "real mode" capability in which they behave like an 8086 processor. Even when in real mode, however, the wrap-around operation at the one megabyte boundary described above is not duplicated. To duplicate the one megabyte boundary wrap-around operation of the 8086 microprocessor, the address line for the twentieth bit (A20 line) must be forced low by logic external to the microprocessor. If the twentieth address line (A20) is forced low in appropriate circumstances, the 80286, 80386, 80486, and Pentium processors simulate the 8086 one-megabyte boundary wrap-around, thereby maintaining compatibility with software written for the 8086 processor.

The prevailing method developed by the industry for forcing the A20 line low involves generating a MASK-A20 signal. When this MASK-A20 signal is activated, the address line for the twentieth address bit is forced low, which will then result in a wrap-around at the one-megabyte boundary. The MASK-A20 signal is generated using an extra, unused pin on the 8042 keyboard controller. FIG. 1 shows a general diagram of a prior art system. The 8042-based method of generating the MASK-A20 signal requires little or no extra hardware, and this solution was somewhat convenient when it was devised. Yet it is now clear that using the 8042 for generating the MASK-A20 signal in the manner shown in FIG. 1 is very slow and inefficient. Activating and deactivating the MASK-A20 signal in this manner requires that a command be sent to the 8042 controller 31, which then executes a routine to carry out the MASK-A20 command. Although this design is clumsy, there are obstacles to simply casting this design aside in favor of a better design. A large amount of software has been written that relies on the assumption that the MASK-A20 signal is controlled by the 8042 controller 31. Retaining compatibility with this existing software therefore requires hardware compatible with the 8042-based arrangement.

Like the MASK-A20 signal, a RESET-CPU signal has also been controlled by an extra, unused pin on the 8042 keyboard controller 31. The RESET-CPU signal is used to reset the microprocessor. One purpose of resetting the microprocessor is to switch from protected mode to real mode in an x86-based system. Resetting the system automatically puts the microprocessor in real mode, the default operating mode. Once the system is reset, the resetting program regains control of the CPU, and thereafter executes in real mode. Unlike the 80386 and higher processors based on the x86 architecture, the 80286 does not have a specific instruction for switching from protected mode to real mode. This 8042-based solution was devised to simulate such an instruction in the 80286. As a result, software was developed for the 80286 based on the assumption that the RESET-CPU function was controlled by the 8042. And like the MASK-A20 function, controlling the RESET-CPU signal with the 8042 is slow, but retaining compatibility with existing 80286 software requires hardware compatible with this 8042-based arrangement.

Attempts have been made to improve the 8042-based procedure for controlling the MASK-A20 and RESET-CPU signals. Installing a separate hardware port for these functions and using logic other than the 8042 to perform the task of generating the MASK-A20 and/or RESET-CPU signals are proposed solutions. These implementations, however, result in a system incompatible with existing software. Another proposal was made in U.S. Pat. No. 5,226,122, issued to Thayer et al., to which reference may be had for a further description of the conventional 8042-based implementation, described above. Thayer et al. disclosed the use of one or more programmable logic arrays or gate arrays for regulating slow commands in place of allowing the 8042 to control the commands. See FIG. 2. This solution retains compatibility with 8086-based software, but is relatively expensive and has not been widely implemented.

What is needed, therefore, is a method or apparatus for increasing the speed of the MASK-A20 and RESET-CPU commands, while maintaining full compatibility with existing 8086 software that uses the 8042 keyboard controller to change the MASK-A20 signal.

SUMMARY OF THE INVENTION

What is contemplated by the present invention is optimizing a controller that is used in connection with one or more devices where it is known that some operations can be carried out at clock speeds much faster than the normal rate. Speed-adjusting logic used in conjunction with the controller increases the frequency of the clock when certain operations are carried out. The frequency remains at the higher-than-normal speed until it is appropriate to return to the normal processing speed. Other operations can be clocked at the normal rate to retain compatibility with existing peripherals and/or code.

A variable-speed controller for controlling a device is disclosed. The variable-speed controller comprises: command inputs for receiving a plurality of commands; processing logic for processing the commands; signal outputs for sending signals to the device; speed-adjusting logic capable of clocking the processing logic at a plurality of frequencies, including a higher frequency and a lower frequency; and control logic for controlling the speed-adjusting logic so that the processing logic is clocked at the higher frequency when a high-speed command is presented at the command inputs, and at the lower frequency when a command that is not a high-speed command is presented at the command inputs.

A method of operating a controller is also disclosed. The method is carried out in the context of a system where the controller controls one device, where the controller receives a plurality of commands including a high-speed command and a normal-speed command, and where the high-speed command is capable of being carried out at a faster clock speed than the normal-speed command. The method comprises the steps of: monitoring the commands received by the controller for a received high-speed command; monitoring the commands received by the controller for a received normal-speed command; and clocking the controller at a first frequency when the received high-speed command is received by the controller and at a second frequency when the received normal-speed command is received by the controller.

In the foregoing method, the first frequency is higher than the second frequency. The first frequency is also sufficiently high so that the normal-speed command cannot be properly executed at the first frequency.

BRIEF DESCRIPTION OF THE DRAWINGS

A better understanding of the present invention can be obtained when the following detailed description is considered in conjunction with the following drawings, in which.

DETAILED DESCRIPTION

In a typical embodiment of the present invention, the speed at which a controller operates is dynamically adjusted. The speed is adjusted so that the controller executes certain operations at a higher-than-normal clock rate, while other operations are executed at the normal clock rate. Some operations must be executed at the normal rate to retain software and/or hardware compatibility, but other operations do not have such restraints. The controller or logic associated with the controller recognizes commands that correspond to the operations that are capable of being carried out faster than at the normal rate. In response to one of these high-speed commands, the controller clock rate is increased to a higher-than-normal frequency until the commanded operation is complete, at which time the clock returns to the normal frequency. Alternatively, it is possible that a command will indicate that a series of subsequent commands will also be capable of being carried out at a faster-than-normal rate. In such an embodiment, the clock will return to the normal rate preferably only after the series of subsequent commands is complete. The present invention enables high-speed commands to be carried out very quickly, yet other commands (i.e., commands that are not high-speed commands) can be carried out more slowly as required by hardware constraints or compatibility constraints.

Figure 1:
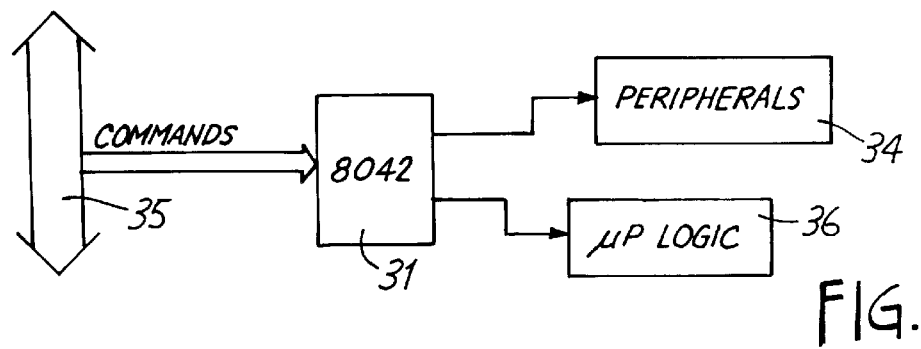
FIG. 1 shows a computer with an 8042 keyboard controller implementation of the MASK-A20 and FORCE-A20 signals as known in the prior art.
Figure 2:
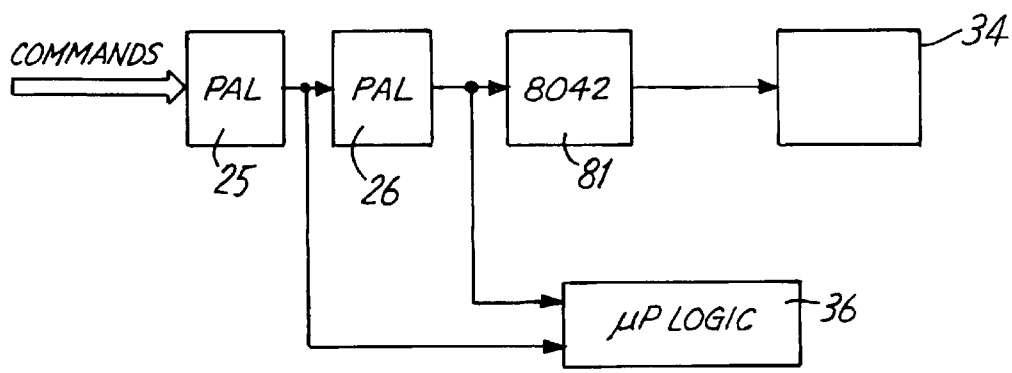
FIG. 2 shows a computer with a programmable logic array implementation of the MASK-A20 and FORCE-A20 signals that involves the 8042 controller.
Figure 3:
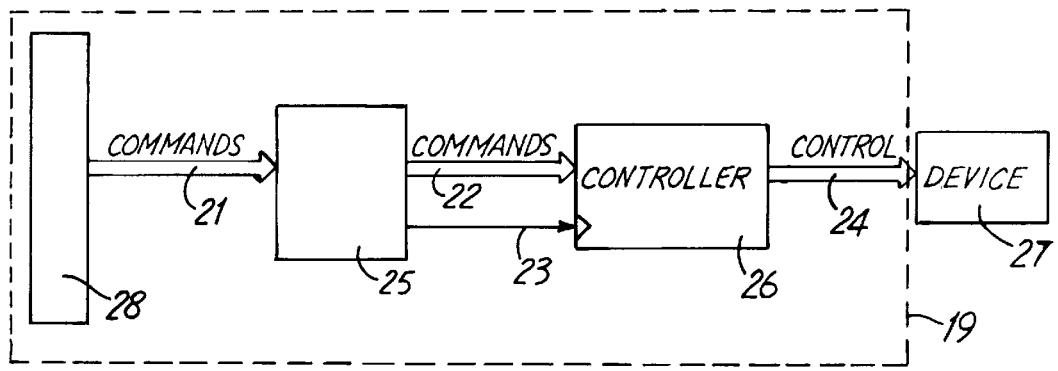
FIG. 3 shows an embodiment of the present invention which includes external logic for adjusting the speed of a controller that controls a single device.

FIG. 3 shows an embodiment of the present invention, where external logic 25 is used to adjust the clock speed of the controller 26. The controller 26 controls device 27 using connection 24. Commands are sent to a controller 26, but the commands are first decoded by external logic 25. External logic 25 decodes the commands it receives on connection 21 to determine if a high-speed command has been sent. If no high-speed command is decoded, the command is passed through to the controller 26 over connection 22 and the controller is clocked at the normal rate (or at the rate otherwise appropriate for the command being processed). On the other hand, if a high-speed command is decoded by external logic 25, the command is passed through to the controller 26 over connection 22 and the frequency at which the controller clock signal (connection 23) is pulsed is increased by the external logic 25 so that the high-speed command is processed by the controller 26 at a faster-than-normal rate.

Figure 4:
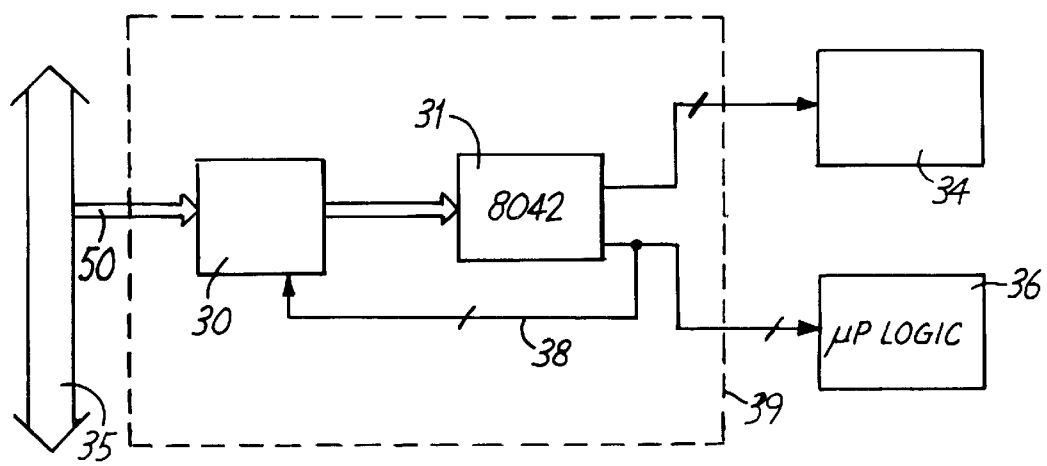
FIGS. 4, 4a, and 5 show an embodiment of the present invention where external logic is used to adjust the speed of the 8042 keyboard controller.

In FIG. 4, an x86-based computer uses an 8042 controller 31 to control certain operations involving the peripheral device 34 and microprocessor logic 36. Other devices may be appropriate, but often the peripheral device 34 is a keyboard scanner or a mouse-related device. For example, in one embodiment, the controller 31 is used to poll a keyboard scanner periodically to obtain the scan code generated by the keyboard scanner. The keyboard scanner polling operations are carried out by the 8042 controller 31 at a normal rate of 6 or 12 MHz.

The 8042 controller 31 is also used to generate the MASK-A20 and RESET-CPU signals that control 80×86 microprocessors. When the 8042 carries out the MASK-A20 and RESET-CPU operations, it generates the appropriate signal and sends it to the microprocessor logic (e.g., a 80486 microprocessor) 36. Unlike the operations involving the slower peripheral 34, the MASK-A20 and RESET-CPU operations can be executed by the 8042 at a much higher clock frequency.

With the present invention, therefore, the MASK-A20 and RESET-CPU operations are carried out quickly by clocking the 8042 controller 31 at a higher-than-normal frequency. For other operations, such as those involving keyboard scanner, the 8042 controller 31 is clocked at the normal frequency (e.g., 12 MHz). By varying clock-speed frequencies, full software and hardware compatibility is retained with the conventional prior art 8042-implementation, yet the MASK-A20 and RESET-CPU commands are executed much more quickly than the prior art 8042-implementation.

The MASK-A20 and RESET-CPU controller commands are received from the bus 35 and detected by the external logic 30 in FIG. 4. The speed at which the 8042 controller 31 operates is then increased by the external logic 30 so that these commands are executed at a higher clock rate. A feedback connection 38 can be used by the external logic 30 in determining when the execution of the MASK-A20 or RESET-CPU command is complete. All other commands (i.e., normal-speed commands) sent to the external logic 30 are carried out by the 8042 controller 31 at the normal rate. The higher clock rate used for the MASK-A20 and RESET-CPU commands reduces substantially the amount of delay involved in executing these commands, yet full compatibility with prior art software is retained and full compatibility with peripheral device 34 is also retained.

Figure 4A:
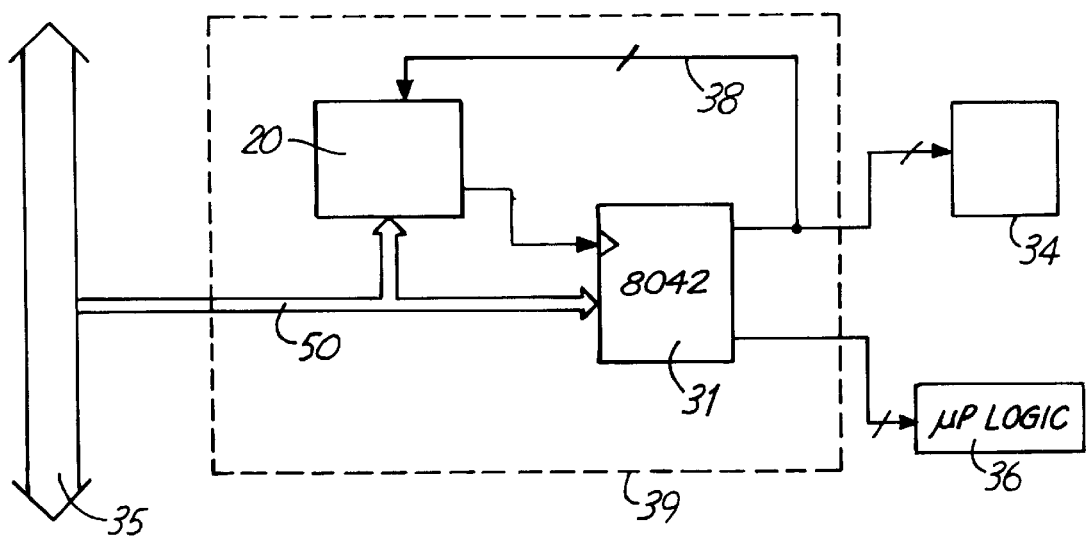

FIG. 4a shows an implementation similar to FIG. 4, but external logic 20 merely samples the commands on connection 50. Unlike the commands received by external logic 30 in FIG. 4, the commands do not "pass through" the external logic 20. The terms "receiving," "monitoring," or "sensing" commands are defined herein to include, without limitation, implementations shown in or similar to FIGS. 4 and 4a. Similarly, as used in the claims, "receiving" commands "from said bus" is herein defined to include receiving commands from the bus through other devices between the bus and command inputs. What is required is only that the commands at some time be on the bus.

The microprocessor logic 36 as used in the drawings is defined herein as either a microprocessor alone, or a microprocessor with translation logic. With the 80486 or Pentium processor, the MASK-A20 and RESET-CPU signals are sent directly to the appropriate pins on the microprocessor. In an 80486 or Pentium-based system, therefore, the microprocessor logic 36 may consist of only the microprocessor. But unlike the 80486 and Pentium processors, the 80286 and 80386 microprocessors have no MASK-A20 pin. Therefore, signals are sent first to translation logic, which then masks the A20 line from the microprocessor to the system's memory controller. The microprocessor logic 36 for these latter systems may comprise both translation logic and a microprocessor.

Figure 5:
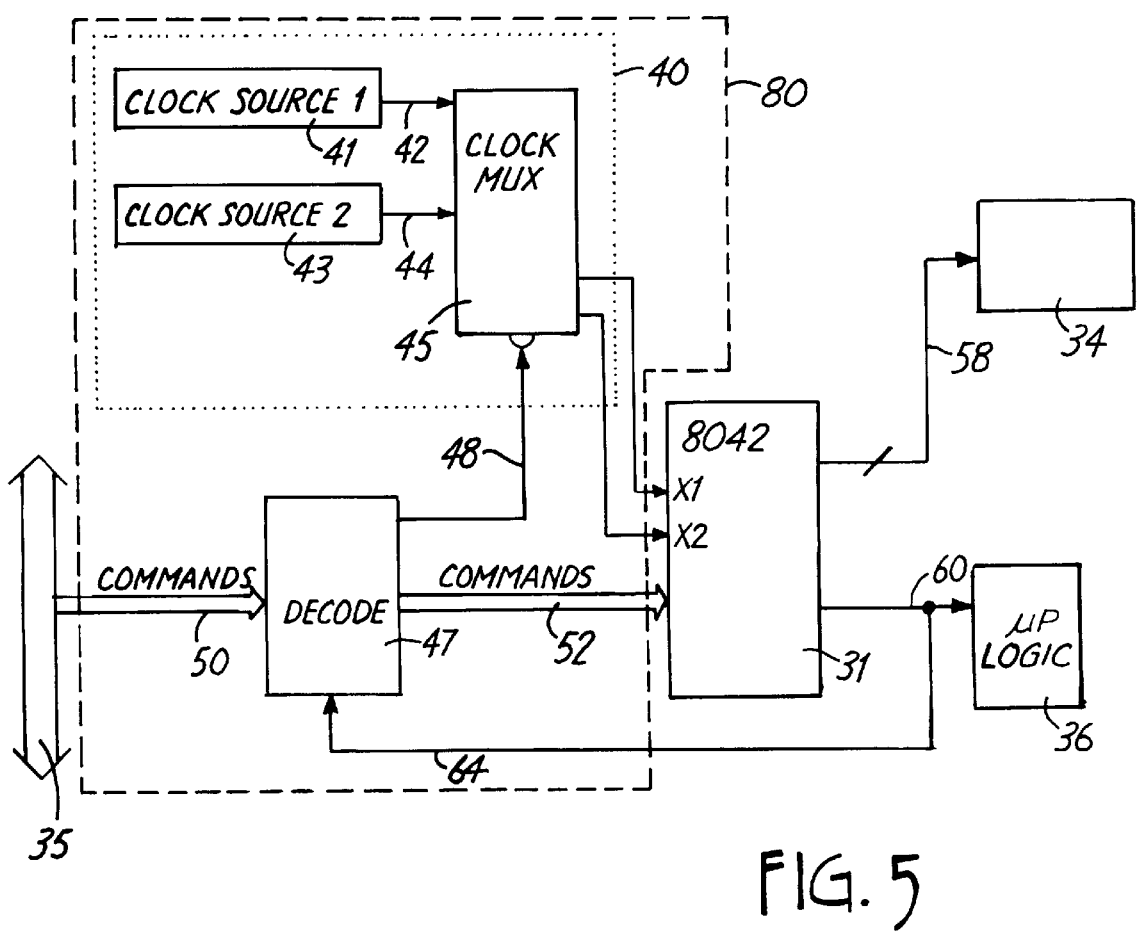

FIG. 5 is a more detailed depiction of FIG. 4, where external logic 30 comprises clock selection logic 40, decode logic 47, and associated connections. In the embodiment of FIG. 5, the clock selection logic 40 comprises at least two clock sources 41 and 43, and a clock multiplexer 45. The decode logic 47 generates a selector signal which is sent to the clock multiplexer 45 via connection 48. In this particular embodiment, the selector signal on connection 48 is a means for controlling the clock selection logic 40 so that one of the two clock sources 41 or 43 is used to clock the 8042 controller 31.

Upon receipt of either the MASK-A20 or the RESET-CPU command, the decode logic 47 generates a selector signal 48 that causes the clock multiplexer 45 to select the faster of the two clock sources 41 or 43. The clock multiplexer 45 passes one of the two clock signals (connection 42 or 44) to the X1 and X2 inputs of the 8042 controller. (An appropriate arrangement is sending the selected clock signal to the X1 input and the logical opposite of the same signal to the X2 input.) In addition to generating the selector signal, the decode logic 47 passes though the commands on connection 50 to the 8042 controller 31 via connection 52. The decoded command is then executed by the 8042 controller 31 at the higher clock rate. The 8042 controller 31 can accommodate an increased clock frequency of at least 16 MHz.

For each command received by the decode logic 47, the foregoing decode and clock-selection steps are performed. When a command other than a MASK-A20 or RESET-CPU command is detected by the decode logic 47, the slower of the two clock sources 41 and 43 is selected. Compatibility is therefore retained with the peripheral device 34 because commands associated with the peripheral device 34 are carried out at the normal rate. Also, software compatibility is retained with respect to the MASK-A20 and RESET-CPU commands because they are still carried out by the 8042 controller.

While FIG. 5 shows only two clock sources 41 and 43, it is within the scope of the present invention to use more than two clock sources. In such an embodiment, there could be more than two sets of one or more commands, where commands in each set are executed at a given clock frequency.

Figure 6:
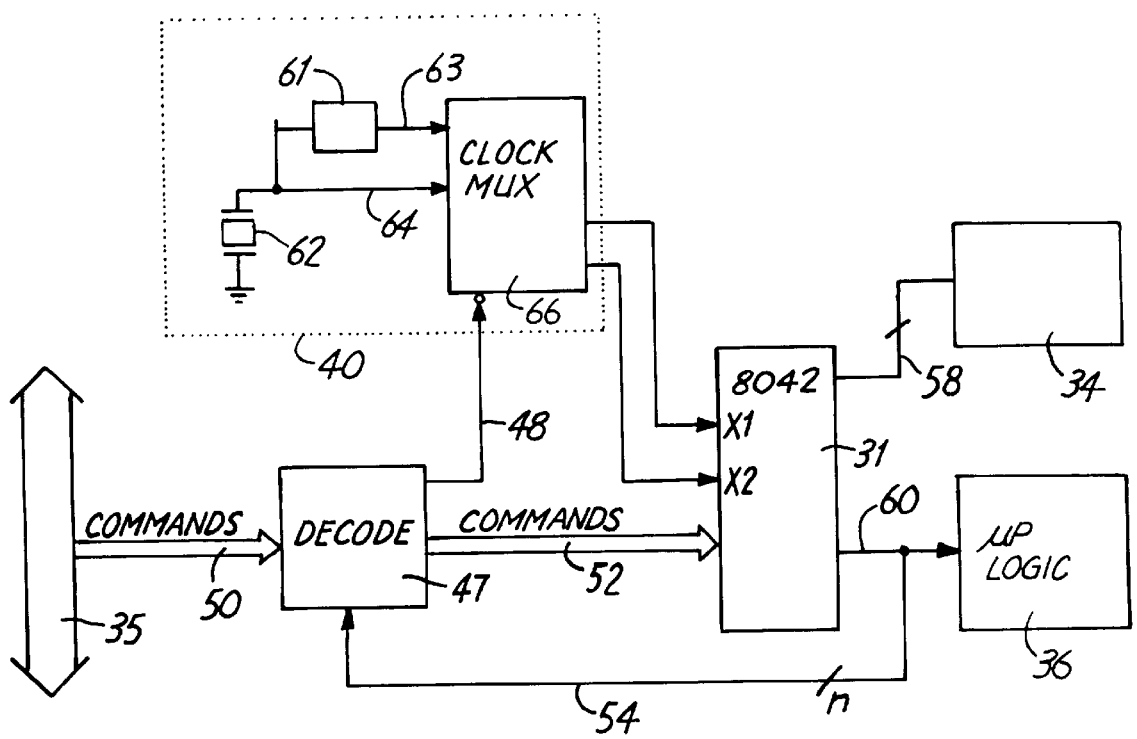
FIG. 6 shows another embodiment of the present invention which includes a clock multiplier.

FIG. 6 shows an alternate embodiment of the present invention, where the clock selection logic 40 comprises a clock multiplexer 65, a clock divider 61, and a clock source 62. The clock source 62 would generate the faster frequency, and the clock divider 61 would divide the clock signal, thereby generating a slower signal on connection 63. The embodiment shown in FIG. 6 operates in a manner similar to FIG. 5, where the decode logic 47 generates a selector signal on connection 48. The clock multiplexer 65 responds to the selector signal by selecting either the signal on connection 63 or the signal on connection 64. The selector signal is a function of the command sent to the decode logic 47.

Figure 7:
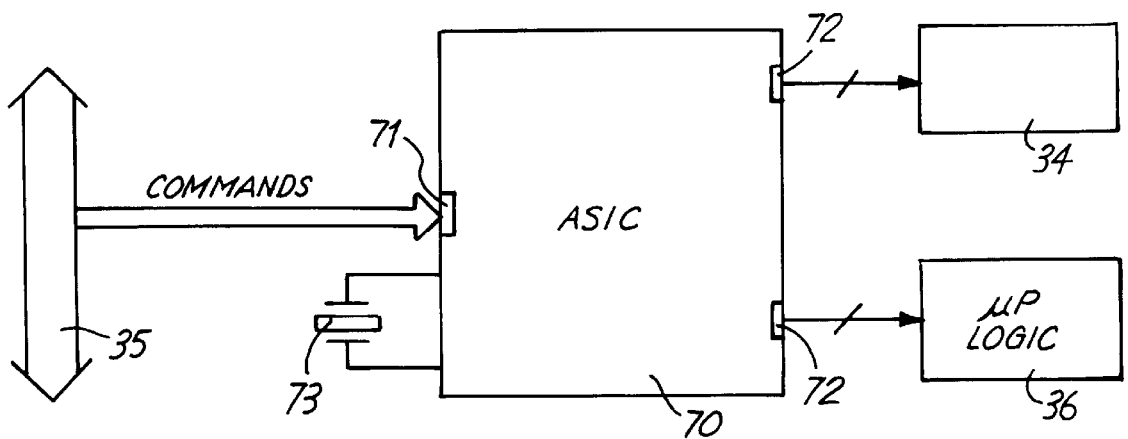
FIG. 7 shows an ASIC-based implementation of the present invention.

FIG. 7 shows the preferred embodiment of the present invention, in which an application-specific integrated circuit (ASIC) 70 is used to implement the functions carried out by the circuitry 19 of FIG. 3 or by the circuitry 39 of FIGS. 4 and 4a. The ASIC 70 has command inputs 71 and signal outputs 72. In an embodiment appropriate for x86-based systems, processing logic within the ASIC 70 processes the commands and duplicates the functions of the 8042. Speed-adjusting logic within the ASIC 70 is capable of changing the rate at which the processing logic processes commands. The ASIC 70 also includes control logic for controlling the speed-adjusting logic so that the processing logic is clocked at an increased frequency when the MASK-A20 and RESET-CPU commands are decoded. An external clock crystal 73 may also be used in connection with ASIC 70. By implementing the present invention in an ASIC, the clock rate can be typically sped up by a factor of three or four.

When a non-ASIC implementation is used (as in FIGS. 3, 4, 4a, 5 and 6), such a wide speed range is generally not attainable.

Although FIGS. 3–7 have been used to illustrate hardware that is appropriate for implementing the variable speed controller of the present invention, other appropriate hardware and methods known to those skilled in the art could be used for implementing the present invention. For example, the present invention is appropriate for systems involving controllers other than the 8042, and for systems involving the control of devices other than those described herein.

Similarly, although the present invention has been shown and described with respect to preferred embodiments, it is not intended to be limited only to the description herein. Various changes and modifications that are obvious to a person skilled in the art to which the invention pertains are deemed to lie within the spirit and scope of the invention as defined by the following claims.

What is claimed is:

1. In a computer system comprising a processor and a controller, a method for adjusting the command execution speed of a controller if a high speed command is received by the controller, wherein the controller executes commands that are not high speed commands at a first clock frequency, comprising:
   (a) determining whether the received command is a high speed command;
   (b) generating a second clock frequency higher than the first clock frequency;
   (c) clocking the controller with the second, higher clock frequency such that the controller executes the high speed command at a higher speed than commands that are not high speed commands; and
   (d) clocking the processor with the processor clock;
   wherein the second, higher clock frequency is higher than the processor clock frequency.

2. The method of claim 1 further comprising:
   (a) determining whether the high speed command has been executed by the controller; and
   (b) clocking the controller at the first frequency if the controller has executed the high speed command.

3. The method of claim 1 wherein the high speed command is a MASK-A20 command.

4. The method of claim 1 wherein the high speed command is a CPU-RESET command.

5. The method of claim 1 wherein the commands that are not high speed commands cannot be properly executed at the second frequency.

6. The method of claim 1, wherein the processor clock frequency is substantially the same as the first, lower frequency.

7. An application-specific integrated circuit for receiving commands from a bus, including high speed commands, and for sending control signals to at least one device in response to the received commands, comprising:
   (a) control logic for determining whether a received command is a high speed command;
   (b) processing logic for executing the received commands; and
   (c) speed-adjusting logic for clocking the processing logic;
   wherein the control logic controls the speed-adjusting logic such that the speed-adjusting logic clocks the processing logic at a first, higher frequency when the received command is a high speed command and at a second, lower frequency when the received command is a normal speed command; and
   wherein the bus is clocked at the second, lower frequency.

8. The application specific integrated circuit of claim 7 further comprising:
   (a) command inputs for receiving the commands; and
   (b) signals outputs for sending control signals to the at least one device.

9. The application specific integrated circuit of claim 7 wherein the at least one device comprises a peripheral device.

10. The application specific integrated circuit of claim 9 wherein the peripheral device is a keyboard scanner.

11. A method of operating a computer system, wherein the computer system comprises a processor, a controller and a peripheral device, wherein the controller receives and executes commands, comprising:
   (a) clocking the processor with a processor clock signal;
   (b) determining whether a command received by the controller is a high speed command; and
   (c) clocking the controller with a controller clock signal, wherein the controller clock signal oscillates at a first frequency when the command received by the controller is a high speed command and at a second lower frequency when the command is a normal speed command;
   wherein the controller is clocked with the controller clock signal while the processor is clocked with the processor clock thereby allowing the controller to execute commands and control operation of the peripheral device.

12. In a digital system comprising a processor clock with a processor clock signal, an apparatus for use with a controller, wherein a plurality of commands are sent to the controller including high speed commands, comprising:
   (a) decode logic for determining whether a high speed command is sent to the controller; and
   (b) clock selection logic for clocking the controller with a first clock signal if a high speed command is sent to the controller and a second clock signal if a normal speed command is sent to the controller, wherein the first clock signal oscillates at a higher frequency than the second clock signal, and wherein the processor is not clocked with the first clock signal;
   such that the controller executes high speed commands faster than normal speed commands.

* * * * *